US012180013B2

(12) United States Patent
Martí Sala

(10) Patent No.: US 12,180,013 B2
(45) Date of Patent: Dec. 31, 2024

(54) MACHINE FOR ORIENTING AND ALIGNING ARTICLES SUPPLIED IN BULK

(71) Applicant: POSIMAT, SA, Barberà del Vallès (ES)

(72) Inventor: Jaime Martí Sala, Sant Cugat del Vallès (ES)

( * ) Notice: Subject to any disclaimer, the term of this patent is extended or adjusted under 35 U.S.C. 154(b) by 50 days.

(21) Appl. No.: 18/031,105

(22) PCT Filed: Nov. 10, 2021

(86) PCT No.: PCT/ES2021/070810
§ 371 (c)(1),
(2) Date: Apr. 10, 2023

(87) PCT Pub. No.: WO2022/106738
PCT Pub. Date: May 27, 2022

(65) Prior Publication Data

US 2023/0365344 A1 Nov. 16, 2023

(30) Foreign Application Priority Data

Nov. 23, 2020 (ES) ............................ ES202032531U

(51) Int. Cl.
*B65G 47/80* (2006.01)
*B65G 29/00* (2006.01)
(Continued)

(52) U.S. Cl.
CPC ......... *B65G 47/24* (2013.01); *B65G 47/1485* (2013.01); *B65G 47/80* (2013.01);
(Continued)

(58) Field of Classification Search
CPC .... B65G 47/24; B65G 47/80; B65G 47/1485; B65G 2201/0244; B65G 2203/0225; B65G 2203/0233
(Continued)

(56) References Cited

U.S. PATENT DOCUMENTS 5,370,216 A * 12/1994 Tsuruyama ............ B65G 47/24 198/395
5,542,233 A * 8/1996 Graffin .................. B67C 7/0046 53/367
(Continued)

FOREIGN PATENT DOCUMENTS

EP 0952099 A2 10/1999
EP 1650143 A1 * 4/2006 ......... B65G 47/1457
(Continued)

OTHER PUBLICATIONS

Stäubli_Fast picker robot TP80 by Stäubli—main features_Feb. 7, 2013_pp. 1-8_youtube.

*Primary Examiner* — Douglas A Hess
(74) *Attorney, Agent, or Firm* — Eugenio J. Torres-Oyola; Victor M. Rodriguez-Reyes; Rafael Rodriguez-Muriel

(57) ABSTRACT

A machine for orienting and aligning items supplied in bulk, comprising a first conveyor (10) having a feeder section (11), a collection section (12) and a return section (13); a second conveyor (20); a detection system (30); and a plurality of transfer robots (40) for transferring items from the first conveyor onto the second conveyor, modifying the orientation thereof, where the feeder section is supplied with objects by a feeder device for items in bulk, including a circular centrifugal disc (50) that rotates around an inclined axis (E), with an upper peripheral area (51) adjacent to and substantially at the same level as the feeder section (11), and where the return section (13) is adjacent to the receptacle (50, 53) of the feeder of items in bulk.

17 Claims, 4 Drawing Sheets

(51) Int. Cl.
*B65G 47/14* (2006.01)
*B65G 47/24* (2006.01)

(52) U.S. Cl.
CPC ................ *B65G 2201/0244* (2013.01); *B65G 2203/0225* (2013.01); *B65G 2203/0233* (2013.01)

(58) Field of Classification Search
USPC .................................................. 198/384, 412
See application file for complete search history.

(56) References Cited

U.S. PATENT DOCUMENTS 5,549,189 A * 8/1996 Martisala ........... B65G 47/1457 198/380
7,374,032 B2 * 5/2008 Marti Mercade ...... B65G 47/71 198/400
7,580,773 B2 8/2009 Hariki et al.
7,950,517 B2 * 5/2011 Marti Sala ......... B65G 47/1457 198/396
8,096,403 B2 * 1/2012 Marti Sala ......... B65G 47/1457 198/384
8,701,865 B2 * 4/2014 Forni ..................... B65G 47/24 198/395
9,586,768 B2 * 3/2017 Martí ................... B65G 47/846
11,667,477 B2 * 6/2023 Marti Sala ........... B65G 47/914 193/44
2008/0000816 A1 1/2008 Kenneway
2012/0318639 A1 * 12/2012 Garcia
2018/0305053 A1 10/2018 Schombert
2019/0022869 A1 * 1/2019 Oowatari

FOREIGN PATENT DOCUMENTS

EP 2757044 A1 3/2014
WO 2014/064593 A1 5/2014
WO WO-2019071313 A1 * 4/2019 ................ B25J 5/02

* cited by examiner

MACHINE FOR ORIENTING AND ALIGNING ARTICLES SUPPLIED IN BULK

FIELD OF THE ART

This invention relates to a machine for orienting and aligning items supplied in bulk. Typically, the items are empty packages which must be oriented in a desired orientation, preferably upright, and aligned on a conveyor for supplying a packaging line.

In this case, the orienting and aligning of said items is carried out by means of a plurality of transfer robots which pick up the items from a first conveyor, where the items are in a reclined position and with a random arrangement, and they are placed on a second conveyor in a desired orientation and with an aligned arrangement.

State of the Art

The picking of items, reclined and randomly arranged, from a first conveyor and their placement on a second conveyor in an upright and aligned position is known, for example, from document WO2019082111A1.

However, in that document, the supply of the items in a reclined and random position on the first conveyor occurs by drop. This may result in some items bouncing off of the first conveyor, or being left superimposed, hindering their collection by transfer robots.

This solution further calls for the adjustment of the supply speed of the items to the speed of the first conveyor.

Documents EP2746165A1 and ES201830276U, for example, are also known, similar to the one previously described, but they do not contemplate the modification of the vertical orientation of the items from the reclined position to the upright position, and they also contemplate the supply of the items by drop.

Documents EP2796393 and EP2899148 are also known that describe the collection and orientation of the items from the reclined position to the upright position by means of transfer robots, but wherein the items are supplied on the first conveyor in a reclined and aligned position.

Additionally, in all previously described solutions, the items placed on the first conveyor that are not picked up by one of the transfer robots, and which must be returned to the package feeder, require a specific conveyor and ramp system in order to be placed again at the beginning of the first conveyor, requiring additional devices which complicate and make the final product more expensive.

The current invention solves these and other problems.

BRIEF DESCRIPTION OF THE INVENTION

This invention relates, according to a first aspect, to a machine for orienting and aligning items supplied in bulk.

Said machine comprises, in a manner known per se:

- a first conveyor, formed by a substantially horizontal surface to support and move items in a reclined position and with a random arrangement in a conveying direction, and including a feeder section, supplied from a feeder device for items in bulk, followed in the conveying direction by a collection section;
- a detection system configured to detect the position and orientation of the items placed on the first conveyor;
- a second conveyor including a delivery section;
- a plurality of transfer robots arranged in a transfer area containing the collection and delivery sections, wherein each one of said transfer robots is configured, in response to the detection carried out by the detection system, to pick the items individually from the collection section, orient them in a defined orientation, and place them in alignment on the delivery section.

It will be understood that the first conveyor and the second conveyor may be conveying surfaces, such as rotating discs or rings, belts or bands, presenting a substantially horizontal movable conveyance surface which moves in a conveying direction.

It is understood that the substantially horizontal direction includes a completely horizontal surface, but also a surface with a slight descending slope towards the external perimeter of the first conveyor, away from the receptacle, for example, a slope equal to or less than 5%.

Preferably, the first conveyor lacks alignment elements or cavities that determine the position of the items, allowing for their random positioning and also allowing to modify the item type or size without the need for adjustments to the machine.

According to this invention, the machine consists in a first conveyor including, along its path, a feeder section and a collection section. In the feeder section, the items are placed on the first conveyor by means of a feeder device; in the collection section the items are picked up individually by means of transfer robots.

The machine further consists in a second conveyor including a delivery section, the collection section of the first conveyor and the delivery section of the second conveyor being located in a transfer area in association with a plurality of transfer robots arranged in succession along said transfer area for the picking up of items placed on the collection section and for the placement of said items on the delivery section.

Said collection and delivery sections are preferably sections running parallel to one another, providing a transfer area of some length wherein said plurality of transfer robots may be placed in succession.

Thanks to a detection system, which typically consists in a camera, for example located above the first conveyor, upstream of the transfer robots, and connected to a control device executing a recognition algorithm of the items captured by said camera and of their position and orientation, the transfer robots determine the position and orientation of the items to be collected; optionally the first conveyor may be transparent or translucent and be backlit to enhance the contrast of the items. The control device also controls the transfer robots based on the position and orientation of the items in order to guide said transfer robots to grip one of said items and to modify its orientation so as to succeed in placing them, with the defined orientation, on the second conveyor. Preferably, the defined orientation is an upright orientation in which the item is standing with an opening on its upper end.

Optionally, it is proposed that at least one first transfer robot be adapted to grip items located substantially in a first orientation and to place them in an upright position on the second conveyor, and that at least a second transfer robot be adapted to grip items located substantially in a second orientation and to place them in an upright position on the second conveyor, each robot being specialised in gripping items with a determined orientation. Thus, the construction of each particular robot is simplified, requiring less freedom of movement of the items, and it allows to accelerate the handling of the items.

The first orientation may be facing upwards and the second orientation may be facing downwards. Alternatively, the first orientation may be substantially transversal to the first conveyor and the second position may be substantially longitudinal to the first conveyor.

The detection system may include one single camera, whose information will guide all of the transfer robots, or it may include a camera upstream of each of the transfer robots, or a camera integrated in each one of the transfer robots.

However, this invention also proposes, in a manner unknown in the state of the art, that:

- the feeder device for items in bulk include a circular receptacle with a bottom part formed by a circular centrifugal disc that rotates around an inclined axis relative to the vertical and defines a lower peripheral area surrounded by a perimeter wall to store items in bulk, and an upper peripheral area, adjacent and substantially at the same level as the feeder section and lacking a perimeter wall interposed between the upper peripheral area and the feeder section, for transferring said items, through lateral sliding, from the upper peripheral area of the centrifugal disc to the feeder section when the centrifugal disc rotates at sufficient speed; and
- the first conveyor also include a return section following the collection section in the conveying direction, adjacent to the receptacle and configured to transfer those items remaining on the first conveyor after passing through the collection section directly to the interior of the receptacle or directly to the feeder section.

Therefore, it is proposed that the feeder device providing the items to the first conveyor comprise a receptacle where a number of items in bulk is placed and stored. Said receptacle may be filled by means of a filling device, such as, for example, a conveyor belt or by means of the periodic dumping of item batches, manually or automatically by means of a dumping device.

Optionally, it is proposed to include a filling sensor of the receptacle configured to detect the filling level of the receptacle or the number of items contained within the receptacle, the filling device possibly being coordinated, through a control device, with the filling sensor in order to avoid the overflowing of the receptacle.

The filling sensor may be, for example, an optical or acoustic sensor, such as a camera, a photoelectric cell, a sonar or a laser sensor, and may be located above the receptacle and facing downwards, or it may be a weighing device connected to the centrifugal disc for the weighing of the items contained in the receptacle, or it may be an optical sensor, such as a laser, configured to detect items contained within the receptacle and which project above a horizontal or inclined plane above at least part of the receptacle. It is also contemplated that the filling sensor consist in a counter of items that are supplied to the receptacle and a counter of the items that leave through the second conveyor or which are handled by the transfer robots, therefore making it possible to know, from the difference between both numbers, the number of items contained in the receptacle.

The bottom part of said receptacle is formed by a centrifugal disc that rotates around an axis inclined relative to the vertical. The centrifugal disc is perpendicular to the inclined axis, and therefore is inclined relative to the horizontal.

Said inclined axis is, preferably, inclined between 5° and 20° relative to the vertical, and therefore the centrifugal disc will also be inclined between 5° and 20° relative to the horizontal.

Since the centrifugal disc is inclined, it will have a lower side and a higher opposite side. The higher area of the centrifugal disc constitutes an upper peripheral area, which is adjacent and substantially at the same level as a feeder section of the first conveyor, and without any interposed hindrance, allowing for the transfer of items between the centrifugal disc and the feeder section with no drop of the items occurring. The items will be expelled from the centrifugal disc by effect of the centrifugal force through the upper peripheral area, since it lacks a perimeter wall capable of retaining the items on the centrifugal disc.

It is understood that the feeder section will be a substantially horizontal region of the first conveyor and it will be substantially at the same level as the peripheral edge of the centrifugal disc inclined on its upper peripheral area, the inner edge of the feeder section being adjacent to said peripheral edge of the centrifugal disc inclined on its upper peripheral area, so that the items may pass from the centrifugal disc inclined directly to the feeder section smoothly and without drops.

The perimeter of the centrifugal disc, on the upper peripheral area, will define an arch, relative to a horizontal plane, as a result of being the perimeter of a disc inclined relative to the horizontal, whereas the feeder section of the first conveyor constitutes a horizontal surface; therefore, the external perimeter of the centrifugal disc in the upper peripheral area and the horizontal surface of the feeder section will be substantially at the same level, although not perfectly coplanar along all their length.

It will be understood that the phrase 'substantially at the same level' means that no vertical drop of the items will occur when being transferred from the centrifugal disc to the first conveyor, or that said drop will be insufficient to cause the piling up of the items or their bouncing; for instance, drops equal to or less than 2 cm, or preferably equal to or less than 1 cm.

The rest of the centrifugal disc, which will be lower, constitutes a lower peripheral area, which is surrounded by a perimeter wall retaining the items located in said lower peripheral area on the centrifugal disc.

The items contained in the receptacle will accumulate, by gravity, in the lowest area of said receptacle, above the lower peripheral area of the centrifugal disc. The rotation of the centrifugal disc will cause the traction of the items and their elevation from the lower peripheral area to the upper peripheral area.

The rotation speed of the centrifugal disc will be a defined speed, sufficient to generate, on the items placed on the upper peripheral area, a centrifugal force sufficient to drive them outside of the centrifugal disc. When the items are in the lower peripheral area the perimeter wall retains the items on the centrifugal disc, but when they reach the upper peripheral area, which lacks a peripheral wall, the centrifugal force will expel the items from the centrifugal disc, in a direction tangential to the centrifugal disc, and transfer them to the feeder section of the first conveyor.

Since the upper peripheral area and the feeder section of the first conveyor are substantially at the same level, that is that they substantially coincide in one single horizontal plane, the items are transferred from the centrifugal disc to the first conveyor through lateral sliding, without a relevant drop of said item occurring. This avoids the items from bouncing off or being piled on top of each other, and impedes their supply when the feeder section is full.

The angle of the centrifugal disc and the friction coefficient of its surface will be adapted to ensure that said elevation of the items from the lower peripheral area to the upper peripheral area occurs and also to ensure that said sliding transfer takes place.

Obviously, the centrifugal disc, the first conveyor and the second conveyor will be actuated by means of motors, electric motors for example.

It is also proposed that the first conveyor include a return section after the collection section in the conveying direction. The items that, after passing through the collection section, remain on the first conveyor, because they were not picked up by the transfer robots, reach the return section of the first conveyor. Said return section is adjacent to the receptacle, and is configured either to transfer the items directly within the receptacle, for example by means of a deflector pushing them from the first conveyor towards the inside of the receptacle, or to transfer said items directly to the feeder section of the first conveyor, for example because they are two successive sections of the first conveyor.

It is understood that a deflector may be a vertical wall located above the first conveyor at a reduced height insufficient to allow the passage of the items beneath the vertical wall, said vertical wall crossing the first conveyor with a preferably acute angle from side to side.

Preferably, the centrifugal disc will be a smooth metallic surface, without unevenness, that facilitates the lateral sliding of the items, and the angle will be selected so that the elevation of the items can be achieved with said surface.

Said feeder section of the first conveyor is an section prior to the collection section, in the movement direction of the first conveyor, such that the items supplied on said feeder section have time to stabilise before entering the collection section, facilitating their detection and collection by a transfer robot.

This solution further allows that, if the feeder section is full of items, no space will be left for new items to be transferred through lateral sliding, so that the items remain on the centrifugal disc until the feeder section is free. This allows the number of items that is transferred to the first conveyor to be adjusted automatically and always be as large as possible, without the need for complex and expensive control and adjustment systems.

Therefore, it is proposed that the first conveyor may be a closed-loop conveyor, where the return section is followed, in the conveying direction, by the feeder section.

The collection section of the first conveyor and the delivery section of the second conveyor are, preferably, parallel sections, to maximise the length of the transfer area and allow for the placement of more transfer robots.

The collection section and the delivery section may be laterally adjacent, in which case the plurality of transfer robots may be located on a side of the collection section, on a side of the delivery section or above both sections.

Alternatively, the collection section and the delivery section will be laterally separated, leaving a separation space in between. In said separation space, a plurality of transfer robots may be located.

It is proposed that the perimeter wall of the receptacle be a vertical cylindrical wall surrounding the centrifugal disc and including an upper edge, located at the same level as or beneath a horizontal level defined by the first conveyor, the lower peripheral area of the centrifugal disc being beneath the upper edge of the perimeter wall, and the upper peripheral area being flush or above the upper edge of the perimeter wall. This allows for the centrifugal disc, due to its inclination, to be raised until it goes over the perimeter wall in its upper perimeter area.

According to a preferred embodiment, the first conveyor is an annular conveyor concentric with the receptacle, surrounding it.

This feature allows for any package that falls from the first conveyor within the receptacle at any point of its path (for example if it accidentally escapes from the grip of a transfer robot) to be re-supplied to the feeder device without any additional hassle.

In such a case, the transfer robots may be located at different angular positions relative to the centre of the receptacle, so that the transfer area covers an angular portion of the first annular conveyor. Preferably, the transfer area covers more than half of the first annular conveyor, and/or contains four or more transfer robots.

The perimeter wall of the receptacle may be joined to the first conveyor and rotate jointly therewith, concentrically with the receptacle. That is, the centrifugal disc will be completely surrounded by the feeder section and by the collection section of the first conveyor.

Preferably, the first conveyor will be surrounded, on the outside, by a limiting wall, which will prevent the items from falling or be expelled outside of the first conveyor due to the centrifugal force.

The delivery section of the second conveyor will, preferably, be flush or above an upper edge of the limiting wall. Thus, the limiting wall does not entail a hindrance for the placement of the items on the second conveyor by a transfer robot. The delivery section of the second conveyor may also include a limiting wall on the outside.

According to an alternative embodiment, the feeder section of the first conveyor will be a semicircular section of the first conveyor concentric with the receptacle that surrounds the upper peripheral area of the centrifugal disc, while the collection section will, at least, include a straight section and/or at least a section not concentric with the receptacle.

According to the foregoing, the feeder section will be concentric with the receptacle and adjacent thereto, and will be connected to other non-semicircular and/or non-concentric sections with the receptacle defining the collection section, which will be remote from the receptacle. According to an example, the first conveyor will include two straight sections and two semicircular sections connected back-to-back, forming a loop, where one of the semicircular sections is a feeder section and where at least one of the straight sections, or both straight sections, or the two straight sections and the interposed semicircular section make up the collection section. Locating the transfer robots along the straight sections simplifies their programming, as it does not require to deal with the angular changes in the position of the items, or with the speed changes that entail an angular shift.

Preferably, each transfer robot is provided with a suction or gripping head horizontally movable, movable in a vertical direction, rotatable around a vertical axis and rotatable around a horizontal axis so as to place the items in the defined orientation. These degrees of freedom allow the transfer robot to grip an item in any reclined position and deliver it in any upright position.

It will be understood that the items are, preferably, elongated items along a main axis and that, when they are randomly scattered said main axis will have a landscape format and be substantially horizontal, due to gravity. It will also be understood that the items preferably have an opening on one of their ends, and that said opening will preferably be in an upper end of the item when this is placed in an upright position.

It is also proposed that the centrifugal disc be a smooth disc and/or that the first conveyor have an item-stabilising embossment. The item-stabilising embossment may consist in a matrix of embossed elements with a sufficient density so that each item rests on several of said embossed elements, stabilising their position and keeping them from swinging, and with a reduced embossment, typically equal to or lower than 5 mm, which does not hinder the transfer of the items through lateral sliding.

According to another proposed embodiment, at least the delivery section of the second conveyor includes suction means to retain the items placed on top and/or a plurality of insertion bases, known in the sector as "pucks", configured to receive and keep in the defined orientation the items placed on the second conveyor, when they are items lacking a flat base.

Preferably, the first conveyor will be configured to move in the same direction as the rotation direction of the centrifugal disc, so that the first conveyor will move in the same direction as the centrifugal disc in the feeder sector.

Additionally or alternatively, it is contemplated that the first conveyor be configured to move at a speed lower than the rotation speed of the centrifugal disc, that is, that the feeding speed of the first conveyor, in the feeder section, be lower than the rotation speed of the centrifugal disc in its periphery.

It is also proposed that the second conveyor be configured to move in an opposite direction to the rotation direction of the first conveyor (10) and/or at the same speed as the first conveyor (10), although it is not ruled out that it may rotate in the same direction and at a different speed.

This invention also proposes, according to a non-claimed second aspect in this application, a method for orienting and aligning items supplied in bulk.

Said method comprises, in a manner known per se:

- supplying items, in a reclined position and with a random arrangement, on a first conveyor;
- detecting the position and orientation of the items conveyed by the first conveyor;
- picking up the individual items placed on a collection section of the first conveyor, orienting them in a desired orientation, and placing them in alignment on a collection section of a second conveyor by means of a plurality of transfer robots, in response to the detection carried out.

However, it is also proposed that the item supplying step comprises, in a manner unknown in the state of the art, the following steps:

- placing the items in bulk within a receptacle with a bottom part formed by a centrifugal disc inclined relative to the horizontal;
- rotating the centrifugal disc, around an axis inclined relative to the vertical, at an established speed sufficient to expel the items from the centrifugal disc due to the centrifugal force through an upper peripheral area of the centrifugal disc, transferring the items through lateral sliding to the feeder section of the first conveyor;
- transferring those items that remain on the first conveyor after passing through the collection section (12) directly from the first conveyor to the interior of the receptacle (50, 53) or directly from the return section (13) to the feeder section (11).

Additionally, it is contemplated that the feeder section of the first conveyor move following an arcuate horizontal trajectory concentric with the first disc, that is, one moving around the upper peripheral area of the centrifugal disc surrounding it.

Optionally, the first conveyor will move following a circular horizontal trajectory concentric with the first disc, surrounding it, and the delivery section of the second conveyor will move following an arcuate horizontal trajectory concentric with the first disc.

It is also proposed that the first conveyor be configured to move in the same direction as the rotation direction of the centrifugal disc and/or at a speed lower than the rotation speed of the centrifugal disc.

It will be understood that the references to geometric positions, such as, for example, parallel, perpendicular, tangential, etc., allow for deviations of up to ±5° relative to the theoretical position defined by said terminology.

Other characteristics of the invention will appear in the following detailed description of an exemplary embodiment.

BRIEF DESCRIPTION OF THE FIGURES

The foregoing and other advantages and characteristics will be more fully understood from the following detailed description of an exemplary embodiment with reference to the attached drawings, which must be taken in an illustrative and non-limiting manner, wherein.

DETAILED DESCRIPTION OF AN EXEMPLARY EMBODIMENT

The attached figures depict exemplary embodiments of this invention with an illustrative non-limiting character.

Figure 1:
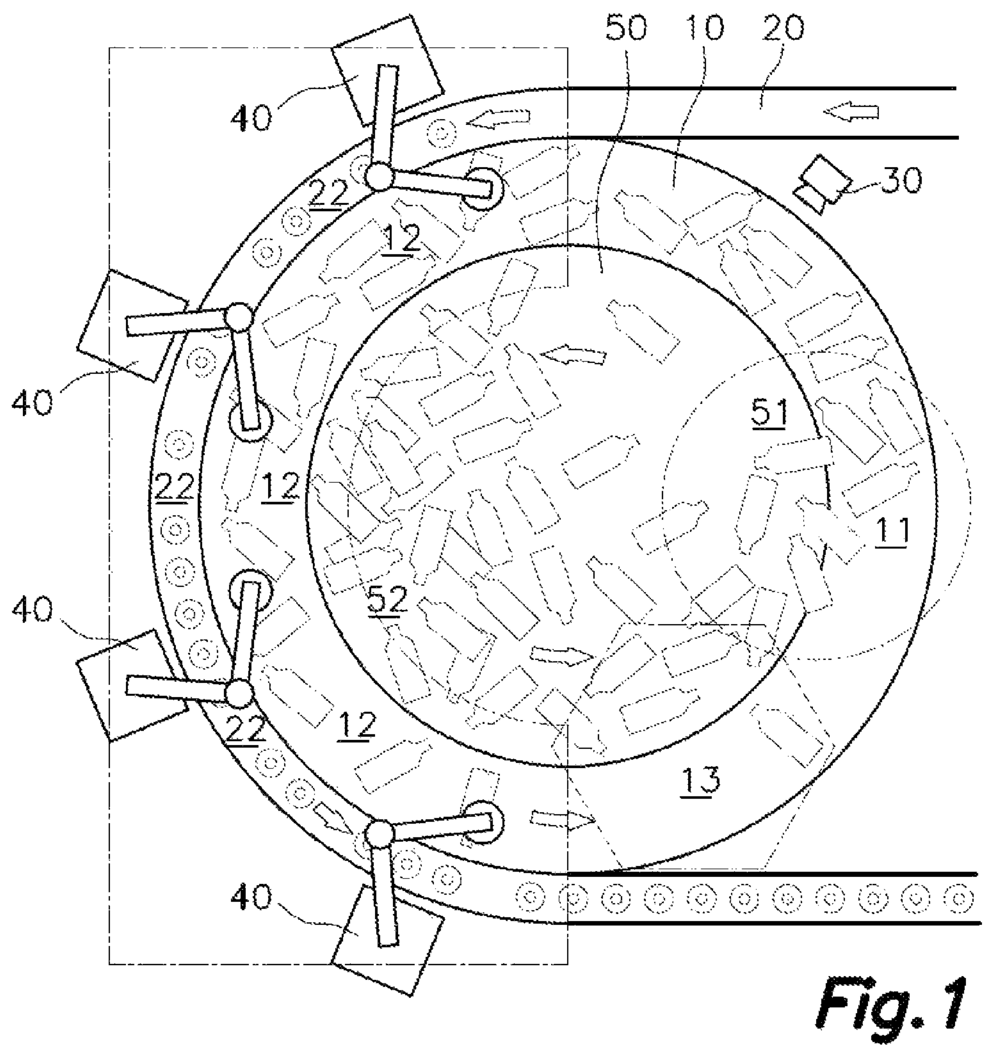
FIG. 1 depicts a plan view of the proposed machine, according to a first embodiment wherein the first conveyor is an annular conveyor which completely surrounds the centrifugal disc, and the second conveyor includes a semi-circular section constituting the delivery section, which is parallel to a part of the first conveyor constituting the collection section, both collection and delivery sections constituting the transfer area, which has been highlighted with a rectangular dashed-line perimeter, where multiple transfer robots operate. In this figure, the upper peripheral area of the centrifugal disc and the collection section of the first conveyor have been highlighted inscribed within a dashed-line circle and the return section has been highlighted inscribed in a dashed-line hexagon.
Figure 2:
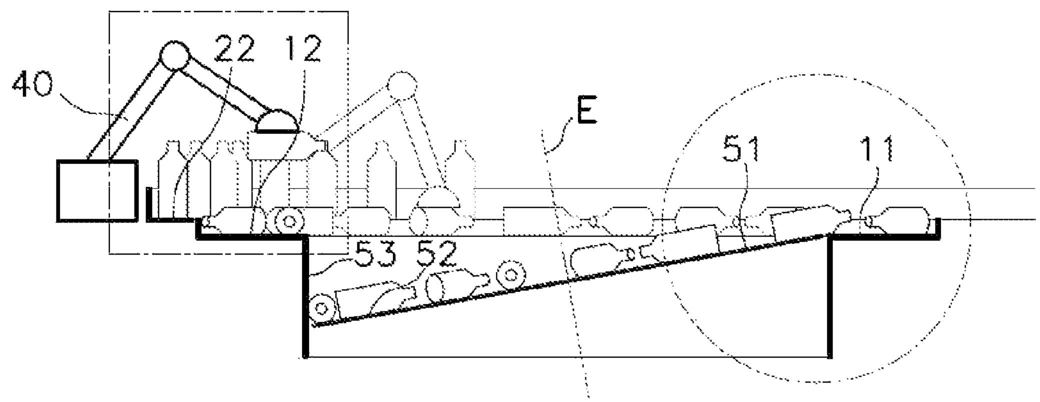
FIG. 2 depicts a cross-sectional view of the machine according to the embodiment depicted in FIG. 1.
Figure 3:
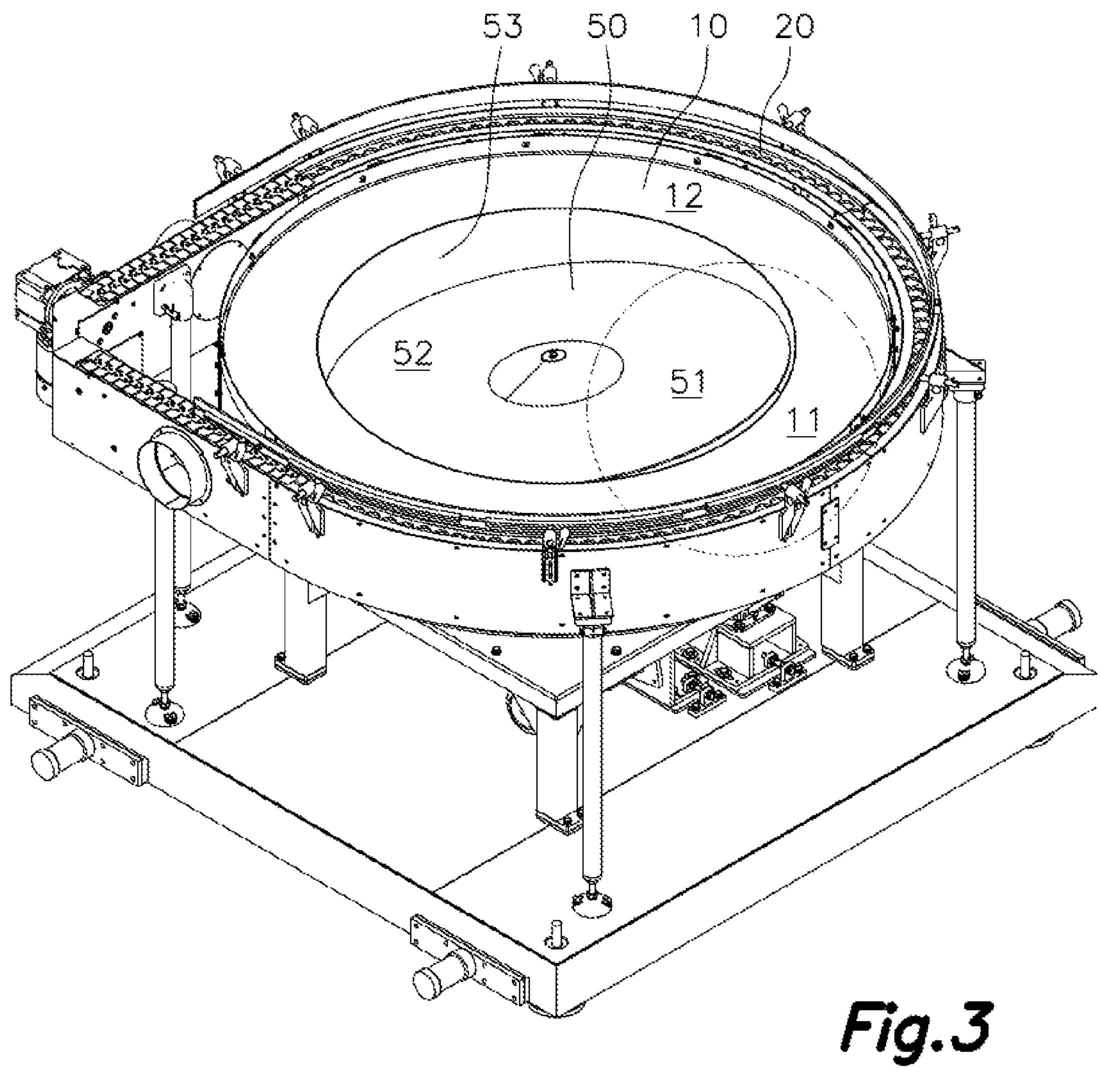
FIG. 3 depicts a perspective view of an alternative embodiment of the machine, including a first annular conveyor around the centrifugal disc.

According to a first preferred embodiment of the invention, depicted in FIGS. 1 and 2, the machine comprises a receptacle (50, 53) defined by a cylindrical and vertical perimeter wall (53) and by a bottom part formed by a centrifugal disc (50) contained within said perimeter wall (53). The centrifugal disc is inclined relative to the horizontal and it rotates, on its centre, around an axis (E) inclined relative to the vertical and perpendicular to the centrifugal disc (50).

The receptacle (50, 53) is completely surrounded by a first conveyor (10), which is a horizontal closed-loop and annular conveyor, concentric with the receptacle (50, 43). In this embodiment, the perimeter wall (53) of the receptacle (50, 53) is attached to the first conveyor (10) and it rotates jointly therewith.

The first conveyor (10) includes, in succession in a conveying direction, a feeder section (11), a collection section (12) and a return section (13) which again precedes the feeder section (11).

The machine further includes a second conveyor (20) provided with a delivery section (22), which in this embodiment is a semicircular section adjacent and parallel to the collection section (12) of the first conveyor (10), surrounding it on the outside.

The centrifugal disc (50) has a more depressed end completely surrounded by the perimeter wall (53), constituting the lower peripheral area (52), and a higher opposite end, corresponding to an upper peripheral area (51), which is not surrounded by the perimeter wall (53) and which is adjacent and substantially at the same level as the feeder section (11) of the first conveyor (10).

The rotation of the centrifugal disc (50) causes the transfer of the items placed within the receptacle (50, 53) of the upper peripheral area (51) to the feeder section (11) through lateral sliding, as a result of the centrifugal force generated.

The items are placed on the first conveyor (10), in a landscape position and with a random arrangement.

When said items are conveyed towards the collection section, a detection system (30) determines the position and orientation of each item placed on the first conveyor (10).

A plurality of transfer robots (40) are located in a transfer area containing the collection section (12) and the delivery section (22). Said transfer robots (40) pick up the items individually from the collection section (12), they place them in a desired orientation, and they place them on the delivery section (22) of the second conveyor (20), in an aligned succession.

Those items which, after passing through the collection section (12) remain on the first conveyor (10), will reach the return section (13), which is adjacent to the receptacle (50, 53), and will remain on the first conveyor (10) until they reach the feeder section (11), where they will join new items and once again pass through the collection section (11).

Figure 4:
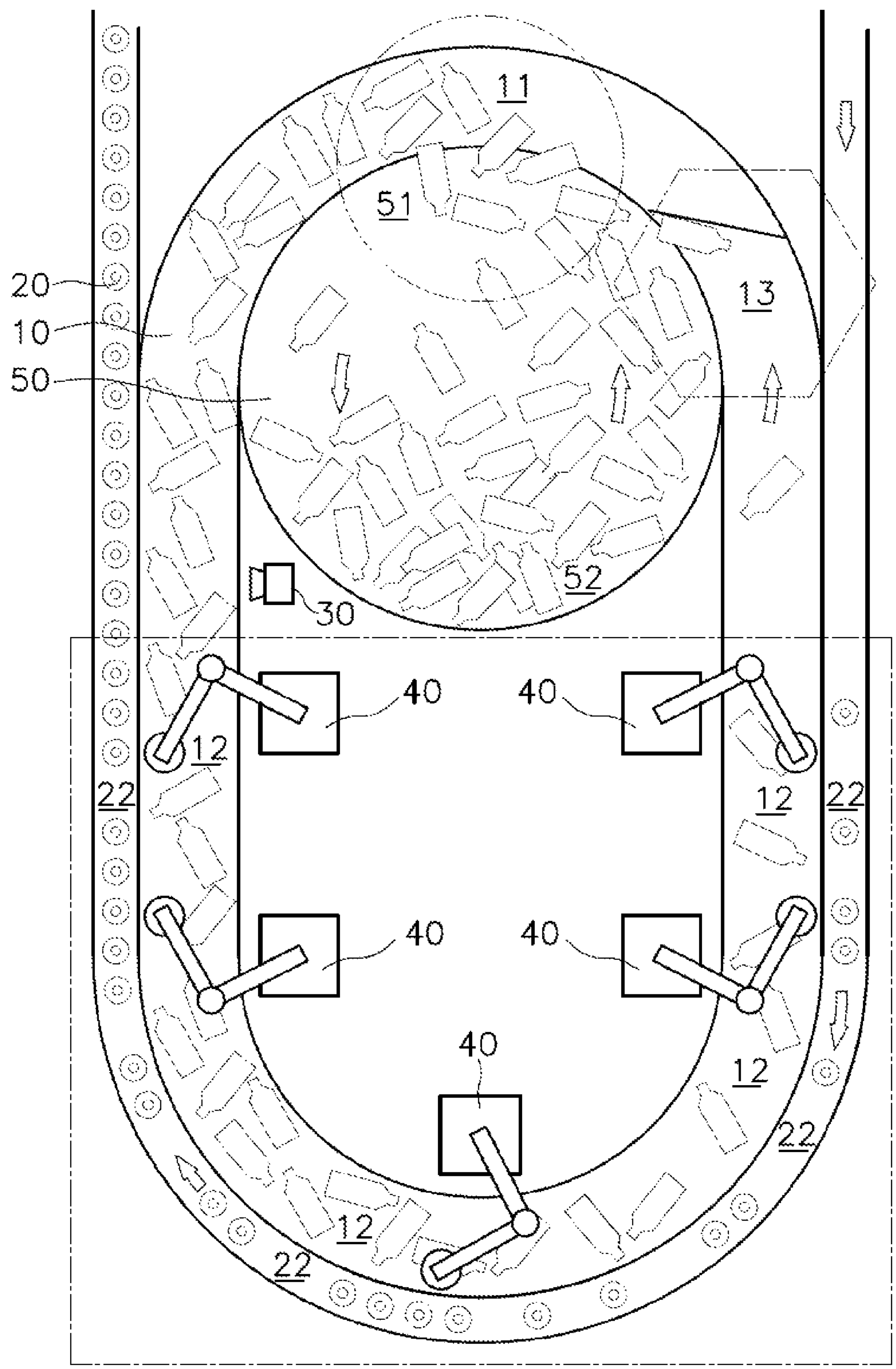
FIG. 4 depicts a plan view of another embodiment of the proposed machine, according to which the first conveyor forms a closed loop formed by a first curved section, concentric with the centrifugal disc and tangential to the upper peripheral area, a second curved section and two straight sections interposed between the ends of the first and the second curved sections, the straight sections and the second curved section being separated from the centrifugal disc and defining a transfer area. In this figure, the upper peripheral area of the centrifugal disc and the collection section of the first conveyor have been highlighted inscribed within a dashed-line circle and the return section has been highlighted inscribed in a dashed-line hexagon.
Figure 5:
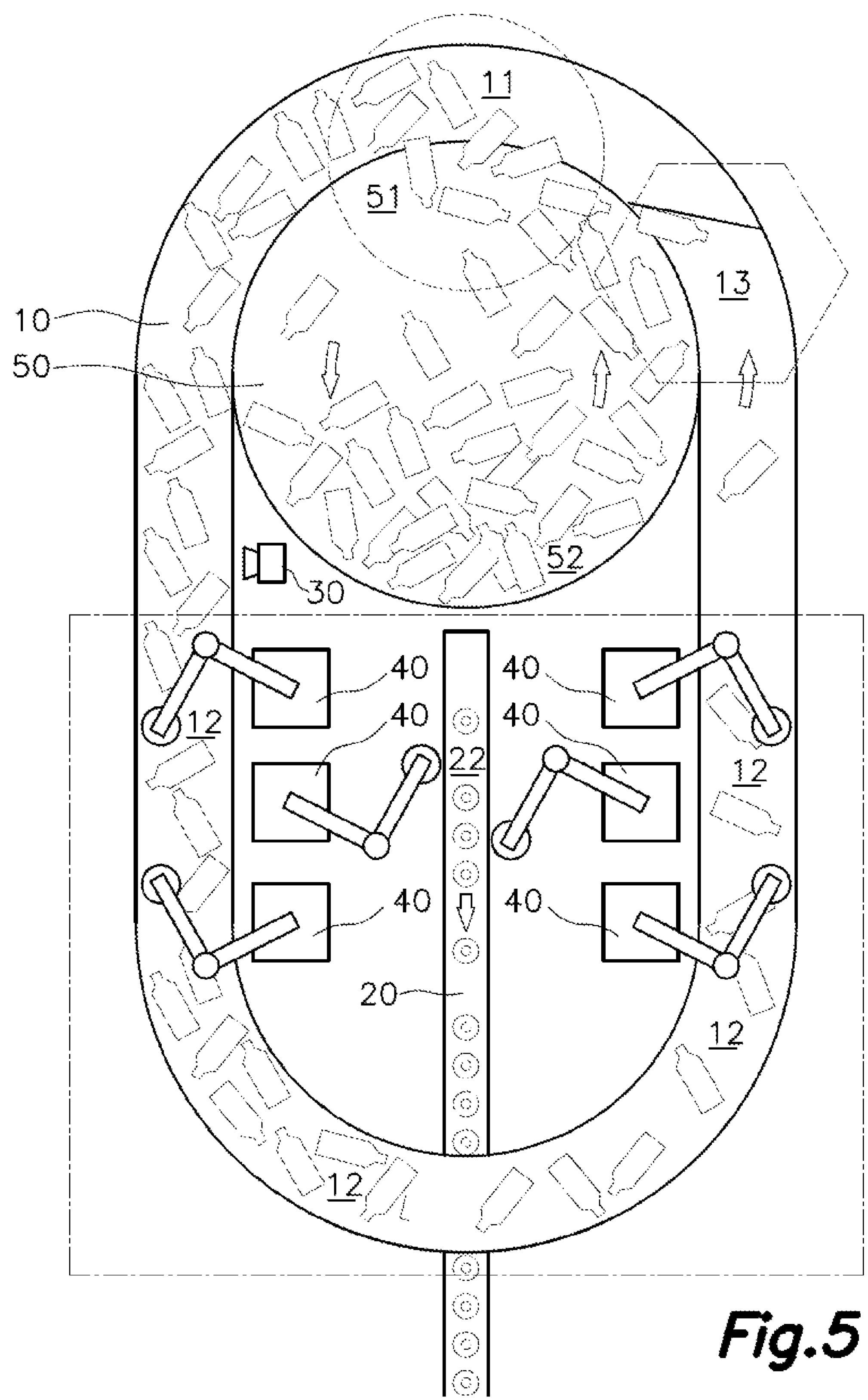
FIG. 5 depicts a plan view of another alternative embodiment, similar to that depicted in FIG. 4, but where the second conveyor is located between the two straight sections of the first conveyor.

According to the embodiment depicted in FIG. 4, the first conveyor (10) includes two semicircular sections and two straight sections connected forming a closed-loop conveyor. One of the semicircular sections includes the feeder section (11), and the two straight sections and the other semicircular section are included in the collection section.

In this embodiment, those items that, after passing through the collection section (12) remain on the first conveyor (10) reach the return section (13) and are returned directly from the first conveyor (10) to the interior of the receptacle (50, 53) by means of a deflector.

The invention claimed is:

1. Machine for orienting and aligning items supplied in bulk comprising:
   - a first conveyor, formed by a substantially horizontal surface to support and move items in a reclined position and with a random arrangement in a conveying direction, and including a feeder section, supplied from a feeder device for items in bulk, followed in the conveying direction by a collection section, and also including a return section following the collection section in the conveying direction;
   - a detection system configured for detecting the position and the orientation of the items located on the first conveyor;
   - a plurality of transfer robots arranged in a transfer area containing the collection section, each one of the transfer robots is configured, in response to the detection carried out by the detection system, to pick items individually from the collection section;
   - the feeder device for items in bulk includes a circular receptacle with a bottom part formed by a circular centrifugal disc that rotates around an inclined axis relative to the vertical and defining a lower peripheral area surrounding by a perimeter wall to store items in bulk, characterised in that
   - the machine further comprises a second conveyor with a delivery section contained in the transfer area, the plurality of transfer robots being configured to orient the items picked up from the collection section in a defined orientation, and place them in alignment on the delivery section;
   - the feeder device for items in bulk further comprises an upper peripheral area, adjacent and substantially at the same level as the feeder section and lacking a perimeter wall interposed between the upper peripheral area and the feeder section, to transfer the items, through lateral sliding, from the upper peripheral area of the centrifugal disc to the feeder section when the centrifugal disc rotates at sufficient speed; and in that
   - the return section of the first conveyor is adjacent to the receptacle and is configured to transfer those items remaining on the first conveyor after passing through the collection section directly from the first conveyor to the interior of the receptacle or directly from the return section to the feeder section.

2. The machine according to claim 1 wherein the first conveyor is a closed-loop conveyor, and the return section is followed, in the conveying direction, by the feeder section.

3. The machine according to claim 1 wherein the collection section and the delivery section are parallel sections and laterally adjacent or parallel sections and laterally spaced out.

4. The machine according to claim 1 wherein the perimeter wall is a vertical cylindrical wall surrounding the centrifugal disc and comprising an upper edge, located at the same level or beneath a horizontal level defined by the first conveyor, the lower peripheral area of the centrifugal disc being beneath the upper edge of the perimeter wall, and the upper peripheral area being flush or above the upper edge of the perimeter wall.

5. The machine according to claim 1 wherein the first conveyor is an annular conveyor concentric with the receptacle, surrounding it.

6. The machine according to claim 5 wherein the plurality of transfer robots are located in different angular positions relative to the center of the receptacle.

7. The machine according to claim 5 wherein the perimeter wall of the receptacle is attached to the first conveyor and rotates jointly therewith.

8. The machine according to claim 5 wherein the first conveyor is surrounded, on the outside, by a limiting wall.

9. The machine according to claim 8 wherein the second conveyor is flush or above an upper edge of the limiting wall of the first conveyor.

10. The machine according to claim 1 wherein the feeder section of the first conveyor is a semicircular section of the first conveyor concentric with the receptacle that surrounds the upper peripheral area of the centrifugal disc and the collection section comprises at least a straight section and/or at least a section not concentric with the receptacle.

11. The machine according to claim 1 wherein each transfer robot is provided with a suction or gripping head horizontally movable, movable in a vertical direction, rotatable around a vertical axis and rotatable around a horizontal axis so as to place the items in the defined orientation.

12. The machine according to claim 1 wherein the centrifugal disc is a smooth disc and/or the first conveyor has an item-stabilizing embossment.

13. The machine according to claim 1 wherein at least the delivery section of the second conveyor comprises suction configurations disposed to retain the items placed on top and/or a plurality of insertion bases configured to receive and keep in the defined orientation the items placed on the second conveyor.

14. The machine according to claim 1 wherein the first conveyor is configured to move in the same direction as the rotation direction of the centrifugal disc and/or at a speed lower than the rotation speed of the centrifugal disc.

15. The machine according to claim 1 wherein the second conveyor is configured to move in an opposite direction to the rotation direction of the first conveyor and/or at the same speed as the first conveyor.

16. The machine according to claim 1 wherein the transfer robots comprise at least a first transfer robot, adapted to grip items located substantially in a first orientation of the first conveyor and to place them in an upright position on the second conveyor, and at least a second transfer robot adapted to grip items located substantially in a second orientation and to place them in an upright position on the second conveyor.

17. The machine according to claim 1 wherein the machine comprises a filling sensor of the receptacle configured to detect the filling level of the receptacle, or the number of items contained within the receptacle.

* * * * *